United States Patent Office 3,401,161
Patented Sept. 10, 1968

3,401,161
PREPARATION OF ε-CAPROLACTAM
Jan van Westerveld and Guillaume A. T. Sligchers, Geleen, Netherlands, assignors to Stamicarbon N.V., Heerlen, Netherlands
No Drawing. Filed Nov. 1, 1965, Ser. No. 505,971
Claims priority, application Netherlands, Nov. 5, 1964, 6412868
6 Claims. (Cl. 260—239.3)

ABSTRACT OF THE DISCLOSURE

A process for conversion of ε-caprolactone to caprolactam by reaction with ammonia is described, using elevated temperatures and pressures in the liquid phase in an inert organic solvent, and without catalyst.

---

The present invention relates to the preparation of ε-caprolactam by reaction of ε-caprolactone with ammonia.

It is known that by treatment of caprolactone at elevated temperature and pressure with a concentrated, aqueous ammonia solution, the lactone may be hydrolized to the hydroxycaproic acid, which may then be reacted with ammonia to form caprolactam, with simultaneous separation of water. According to the U.S. Patent 3,000,880, this process must be carried out at a temperature exceeding the critical temperature of water. In this patent it is also pointed out that reaction of caprolactone with anhydrous ammonia leads to the formation only of polymeric products instead of monomeric caprolactam.

U.S. Patent 2,817,646 describes a process for reacting lactones with ammonia, together with hydrogen, in the presence of a hydrogenation catalyst. In this process the ε-caprolactone yields only small amounts of caprolactam along with large amounts of polymeric lactam and/or hydroxycaproic acid amide. The reaction is preferably not effected in a solvent, especially if the lactone is in the liquid state already at room temperature.

In the present invention, an improved process has now been discovered wherein large yields of ε-caprolactam can be obtained by reaction of ε-caprolactone with ammonia at elevated temperatures and pressures provided the reaction is carried out in the liquid phase in the presence of an inert organic solvent.

Theoretically, the conversion of caprolactone into caprolactam requires one mole of ammonia per mole of lactone, the amount of water formed also being one mole. Usually, in the practice of the present invention an excess of ammonia is used, e.g., from about 2, 3, 5, 15, 30 or up to as much as 50 moles (or more) of ammonia per mole of lactone. If a low degree of conversion only is desired, the amount of ammonia to be used may be smaller, e.g., only about 0.75 or 0.50 mole per mole of lactone. The non-converted lactone, and the intermediary products formed, can be recycled and again be made to react with ammonia. The ammonia is preferably substantially anhydrous ammonia.

The elevated pressure used in the process may be varied. The pressure used depends somewhat on the amount of ammonia used and also on other reaction conditions, such as the temperature. It may furthermore be varied by introducing inert gas, such as nitrogen or hydrocarbon vapor, into the reaction chamber. Elevated pressures of from about 50, 100, 200, 300 and up to about 500 atmospheres may be suitably used, for instance.

The temperature may also be varied within wide limits. Below about 200° C., however, the conversion into caprolactam is very low while the use of very high temperatures above 475° C. generally offers no advantage, and only makes the practice of the process more difficult. Therefore, a temperature of from about 200 to about 475° C. is employed.

In carrying out the process according to the invention, the inert organic solvents may be, for instance, aromatic amines such as pyridine, and higher boiling alkyl ethers, such as dibutyl ether, diamyl ether, and dioxane, and hydrocarbons, such as toluene, xylene, decahydronaphthalene, heptane and octane. Generally these solvents have a boiling point between about 100° C. to 250° C. at atmospheric pressure.

It has been found to be particularly advantageous to effect the reaction in the present of dioxane as the solvent, because at temperatures in the range of about 200–350° C. it is possible to obtain high conversions of the lactone to lactam.

The amount of solvent to be employed is usually 5–10 times as large as the amount, by weight, of lactone starting material, but smaller amounts, e.g., only 2–5 times as large, may also be used. Larger amounts of solvent, e.g., as much as 20, 30, 50 or 100 times as large as the amount by weight of lactone may be used, but such use only reduces the capacity of the reaction apparatus.

The solvent, and also the caprolactam product, can be removed and recovered from the reaction product by distillation. Insofar as the intermediate products are formed—mainly ε-hydroxycaproic acid amide and ε-hydroxycapronitrile—formed by only partial conversion of the caprolactone, they may be reacted again, for instance, after recirculation. If so desired, these intermediary products may also be recovered as by-products.

In addition to the above-mentioned intermediary products, the reaction also yields some polymeric products; however, caprolactam is formed therefrom by thermal depolymerization, and only a small amount of polymeric caprolactam actually obtained. If the reaction is carried out as a continuous process, caprolactam can be separated from the reaction product, and the other products, both intermediates and polymeric products, can be recycled. By adding to the recycled products an amount of caprolactone equal to the amount of caprolactam separated off, the overall lactam product can be obtained at a yield virtually equal to the theoretical amount.

The starting caprolactone material may also be in the form of polymeric caprolactone.

This invention will be further understood by reference to the following examples.

Example I

In a 300-ml. autoclave 28.5 g. of ε-caprolactone, 14 g. of ammonia and 150 ml. of dioxane are heated in a reaction vessel at a temperature of 330° C. for 7 hours; and at pressures measured from 90–125 atm.

After cooling, the reaction mixture is distilled, in which distillation first dioxane and then ε-caprolactam is separated off (the latter at reduced pressure).

The amount of caprolactam separated off is 17 g. (yield 60%), while 12 g. of a higher-boiling product remains behind.

The results of a number of experiments carried out in this way under different conditions are given in Table I.

TABLE I

| Solvent | Weight ratio, solvent: lactone | Molar ratio, NH₃: lactone | Temperature, °C. | Time, hours | Lactam yield (percent) |
|---|---|---|---|---|---|
| Dioxane | 5.45 | 3.3 | 330 | 1 | 38.5 |
| Do | 5.45 | 3.3 | 330 | 2 | 50.0 |
| Do | 5.45 | 3.3 | 330 | 3 | 56.0 |
| Do | 5.45 | 3.3 | 330 | 7 | 60.0 |
| Do | 5.45 | 7.5 | 330 | 7 | 56.5 |
| Do | 2.73 | 3.3 | 330 | 7 | 41.5 |
| Do | 5.45 | 2.0 | 330 | 7 | 50.0 |
| Do | 5.45 | 3.3 | 300 | 7 | 35.5 |
| Dibutyl ether | 4.05 | 3.3 | 330 | 7 | 41.0 |
| Decahydronaphthalene | 4.65 | 3.3 | 330 | 7 | 38.0 |
| Xylene | 4.55 | 3.3 | 330 | 7 | 54.0 |

Example II

The higher-boiling product (12 g.) remaining behind in the experiments described in Example I after the distillation of the caprolactam (yield 60%), is again introduced into the autoclave, together with 14 g. of ammonia and 150 ml. of dioxane, and heated at a temperature of 330° C. for 7 hours, after which the reaction mixture is distilled again.

The amount of ε-caprolactam obtained is 7.3 g. (yield 26%).

The higher-boiling product remaining behind is again introduced into the autoclave, together with 14 g. of ammonia and 150 ml. of dioxane, and heated again at a temperature of 330° C. for 7 hours, after which the reaction mixture is distilled.

The amount of ε-caprolactam obtained is 2.7 g. (yield 9.5%).

Consequently, the total lactam yield in this series of experiments is 95.5%.

Example III

Following the method of Example I, 28.5 g. of ε-caprolactone is reacted with 14 g. of ammonia. After distillation of the reaction mixture, yielding 17.1 g. of ε-caprolactam (0.15 mole), an additional 17.2 g. (0.15 mole) of ε-caprolactone, 14 g. of ammonia and 150 ml. of dioxane are added to the higher-boiling reaction product mixture. The resulting mixture is then again heated at a temperature of 330° C. for 7 hours. After the distillation of this reaction mixture, from which the caprolactam formed is separated off, an equimolecular amount of caprolactone—equal to the amount of caprolactam separated off—is again added to the higher-boiling product, and the mixture is again heated, together with 14 g. of ammonia and 150 ml. of dioxane, at 330° C. for 7 hours. In this way, a series of experiments is carried out, the results of which are given in Table II. This table shows that the amount of caprolactam obtained is virtually equal to the amount of caprolacetone added (yield 96–98.5%).

TABLE II

| Lactone added | | Lactam obtained | | |
|---|---|---|---|---|
| G. | Moles | G. | Moles | Yield (percent) |
| 17.2 | 0.151 | 16.7 | 0.147 | 98 |
| 16.8 | 0.147 | 16.2 | 0.143 | 97 |
| 16.3 | 0.143 | 15.9 | 0.141 | 98.5 |
| 16.0 | 0.141 | 15.2 | 0.134 | 96 |
| 15.3 | 0.134 | 14.7 | 0.130 | 97 |

It will be understood this invention may be practiced in various ways other than those specifically described, and is limited only by the following claims.

We claim:

1. A process for the preparation of ε-caprolactam which consists essentially in treating ε-caprolactone with ammonia at an elevated temperature up to about 350° C. and at an elevated pressure up to about 125 atmospheres in the liquid phase in the presence of an inert organic solvent having an atmospheric boiling point between 100° C. and 250° C.

2. The process according to claim 1 wherein the reaction is effected at a temperature between about 200 and 350° C.

3. The process according to claim 1 wherein dioxane is used as the solvent.

4. The process according to claim 1 wherein said solvent is an alkyl ether.

5. The process of claim 1 wherein said solvent is decahydronaphthalene.

6. The process of claim 1 wherein said solvent is selected from the class consisting of pyridine, dialkyl ether, aromatic hydrocarbons and saturated aliphatic hydrocarbons.

References Cited

UNITED STATES PATENTS 2,817,646  12/1957  Payne _____ 260—239.3
3,000,880  9/1961  Phillips et al. _____ 260—239.3

FOREIGN PATENTS 634,871  1/1962  Canada

HENRY R. JILES, *Primary Examiner.*

R. T. BOND, *Assistant Examiner.*